United States Patent [19]

Broneske

[11] 3,742,977
[45] July 3, 1973

[54] PIPE MOUNTING BRACKET FOR PRESSURE TANK

[76] Inventor: Reuben Broneske, Underwood, N. Dak. 58576

[22] Filed: June 14, 1971

[21] Appl. No.: 152,667

[52] U.S. Cl. .............................. 137/557, 137/271
[51] Int. Cl. ............................................ F16k 37/00
[58] Field of Search................... 137/269, 271, 557, 137/561

[56] References Cited
UNITED STATES PATENTS

| | | | |
|---|---|---|---|
| 1,576,662 | 3/1926 | Leonard.......................... | 137/557 X |
| 719,680 | 2/1903 | Lynch............................ | 137/271 X |
| 1,697,341 | 1/1929 | Campbell........................ | 137/557 |
| 2,529,605 | 11/1950 | Gustafson...................... | 137/557 X |

Primary Examiner—Henry T. Klinksiek
Attorney—Robert E. Kleve

[57] ABSTRACT

The invention comprises an L-shaped pipe mounting bracket for pressure tank. The pipe bracket has an L-shaped configuration and is adapted to be mounted to the outlet pipe of a pressure tank. The pipe bracket has a plurality of mounting bores on its legs for mounting a pressure switch, a pressure relief valve, and a pressure gauge.

2 Claims, 3 Drawing Figures

PATENTED JUL 3 1973  3,742,977
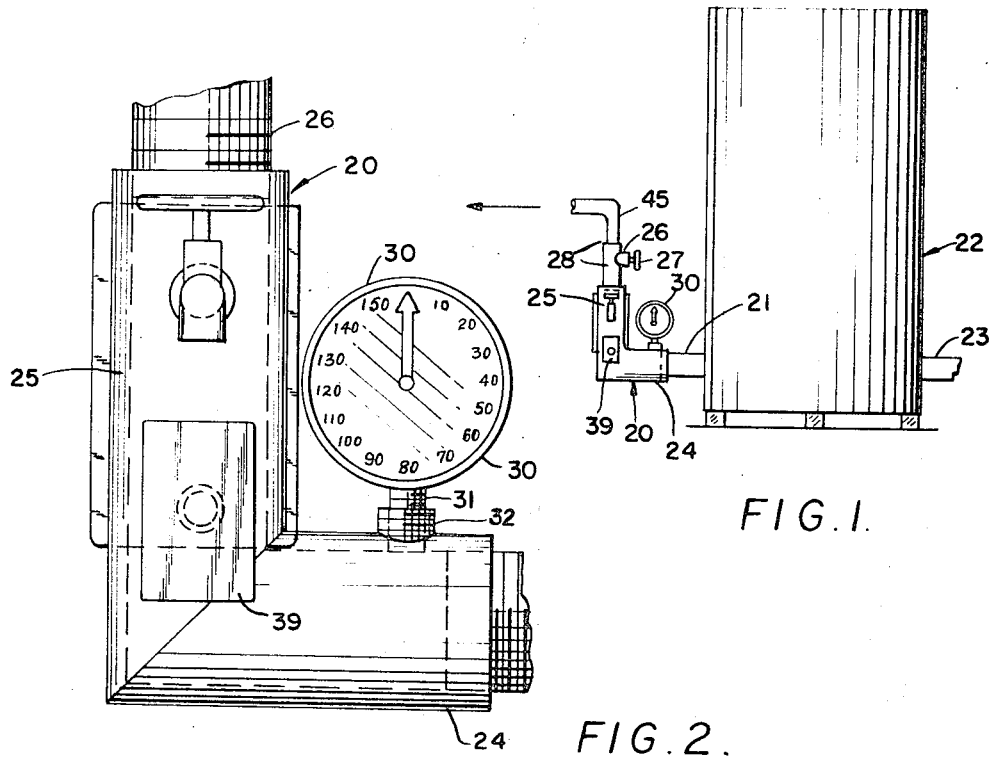
FIG.1.
FIG.2.
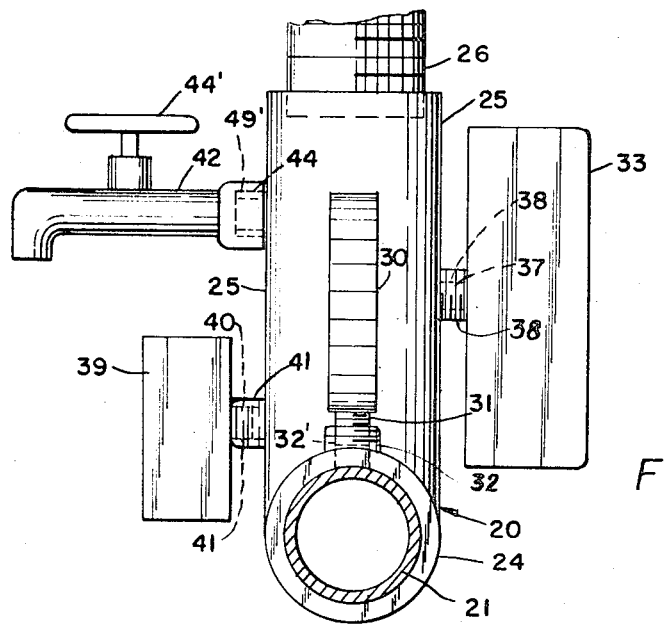
FIG.3.
INVENTOR
RUEBEN BRONESKE
BY Robert E. Klene
ATTORNEY

PIPE MOUNTING BRACKET FOR PRESSURE TANK

This invention relates to mounting brackets, more particularly the invention relates to mounting brackets for presure tank equipment.

It is an object of the invention to provide a novel L-shaped pipe mounting bracket for mounting to the outlet pipe of a pressure tank, with the bracket providing a compact arrangement for mounting instruments and valves for the operation of the pressure tank.

It is a further object of the invention to provide a novel L-shaped pipe mounting bracket for mounting to a pressure tank, with connecting structure on the L-shaped pipe bracket for mounting control and measuring equipment for the pressure tank.

Further objects and advantages of the invention will become apparent as the description proceeds and when taken in conjunction with the accompanying drawing wherein:

FIG. 1 is a side elevational view of the L-shaped pipe mounting bracket shown operatively mounted to the outlet pipe of a pressure tank and with the control and measuring equipment mounted to the L-shaped pipe mounting bracket.

FIG. 2 is an enlarged side elevational view of the L-shaped pipe mounting bracket with the pressure switch, pressure gauge, bib or faucet, and pressure relief valve operatively attached to the bracket.

FIG. 3 is an enlarged front elevational view of the L-shaped pipe mounting bracket with the pressure switch, pressure gauge, bib or faucet and pressure relief valve operatively mounted to the bracket.

Briefly stated, the invention comprises an L-shaped pipe mounting bracket adapted to be mounted to the outlet pipe of a pressure tank, said bracket has a plurality of mounting bores on its legs for mounting a pressure switch, a pressure relief valve, and a pressure gauge.

Referring more particularly to the drawing, in FIG. 1 the L-shaped pipe mounting bracket invention 20 is shown mounted to the outlet pipe 21 of a conventional pressure tank 22.

The pressure tank 22 has an inlet pipe 23 for receiving water into the tank with a conventional one way valve or other suitable means preventing water from traveling back out the inlet pipe from the tank. Water is pumped into the tank from a suitable source and is contained there under pressure.

The outlet pipe 21 allows water to flow out of the pressure tank through the L-shaped pipe mounting bracket invention 20.

The L-shaped pipe mounting bracket 20 has an L-shaped pipe with one leg 24 threaded into the outlet pipe. The other leg 25 has a T-valve member 26 threaded into its other end. The T-valve member 26 is conventional having a handle 27 which may be turned to open and close the pipe part 28 of the T-valve to regulate the amount of water traveling out of the outlet pipe.

A pressure gauge 30 has a threaded hollow collar 31 threaded into a hollow inner bore 32' of the annular mounting collar 32, which collar 32 projects outward from the leg 24 and is fixed thereto. The bore 32" in the mounting collar 32 of leg 35 allows fluid to communicate between the pressure gauge and the water inside the L-shaped pipe bracket from the pressure tank, to cause the pressure gauge to operate to register the amount of water pressure in the tank.

A pressure switch 33 also has a hollow collar 37 threaded into a bore 38' in another annular mounting collar 38 which projects outward from the other leg 25 of the L-shaped bracket and is fixed to the leg 25. The bore 38' enables the pressure switch 33 to be in fluid communication with the water inside the L-shaped pipe bracket coming from the pressure tank, so as to enable the pressure switch 33 to be set for a predelivered amount of pressure in the pressure tank, and when the pressure in the pressure tank drops below that level the fluid communicates will cause the pressure to actuate the pipe (not shown) to pump more water into the pressure tank to increase the water pressure.

A pressure relief valve 39 also has a hollow collar 40 threaded into the bore 41' in the annular collar 41 which projects outward from and is fixed to the leg 25 of the L-shaped mounting bracket. The bore 41' enables the pressure relief valve 39 to be in fluid communication with the water in the L-shaped pipe bracket from the pressure tank. The pressure valve 39 will activate when the water in the pressure tank exceeds the safety level and will open allowing water to flow out of the bore 41 and out the pressure relief valve to reduce the pressure in the tank.

A conventional faucet or bib 42 has a hollow collar 43 which is threaded onto the outside 49' of the annular mounting collar 44 which collar projects outward from and is fixed to leg 25 of the L-shaped bracket. The faucet 42 is also in fluid communication with the water in the L-shaped pipe bracket coming from the pressure tank. The handle 44' may be turned to open the faucet 42 to allow water to flow out of the faucet from the pressure tank under pressure through the L-shaped pipe bracket.

The water from the pressure tank flows through the outlet pipe and through the L-shaped mounting bracket, and from there through the T-valve and along the pipe 45 connected to the T-valve. The pipe 45 is in turn connected with the faucet outlets in a home or building in which the pressure tank is installed to provide water under pressure to the faucets in the home or building.

The L-shaped valve mounting bracket 20 is mounted to the outlet pipe rather than the inlet pipe to register more accurately the pressure of the water coming from the pressure tank into the house or building.

The mounting collars 32, 38, 44, 41 each have identical exterior and interior threading and diameters; and the pressure switch, pressure gauge, relief valve, and faucet all have mounting collars of corresponding inside and outside dimensions and threading so they may be interchanged with anyone of the mounting collars 32, 38, 41, or 44. The mounting collars 32, 38, 41, and 44 are spaced sufficiently far apart so that; for example, the pressure switch 33 may be mounted in the collar 44 and the faucet 47 may be threaded over the mounting collar 38 when mounting conditions are cramped in the area of the L-shaped pipe making such an interchange necessary.

Thus, it will be seen that a novel L-shaped pipe mounting bracket has been provided for the outlet pipe of a pressure tank which will compactly mount the control and measuring instruments for the pressure tank so that they will take up only a minimum amount of space.

It will be obvious that various changes and departures may be made to the invention without departing from the spirit thereof and accordingly it is not intended that the invention be limited to that specifically described in the specification or as illustrated in the drawings but only as set forth in the appended claims wherein:

What is claimed is:

1. A L-shaped mounting bracket device for a pressure tank having an outlet pipe, said device comprising an integrally formed one piece L-shaped mounting bracket, said bracket having a pair of leg members each formed integrally from their one ends to their other ends and hollow therethrough with the leg members being integrally connected together at their one ends in perpendicular relation to form a one piece bracket, one of said leg members having its other end threadably attached to said outlet pipe, said other leg member having its other end threadably connected to a T valve to regulate the amount of fluid traveling out of said pressure tank, said leg members having a plurality of threaded outlets extending laterally from the sides of said leg members for threadably receiving a pressure relief valve, a pressure gauge, and a pressure regulating switch, said outlets providing fluid communication between said relief valve, gauge, and regulating switch and the hollow interior of said leg members of said bracket device.

2. A L-shaped mounting bracket device according to claim 1 wherein said threaded outlets of said leg members are of the same size in relation to one another, whereby said relief valve, gauge and regulating switch may be interchangably received on said outlets.

* * * * *